No. 11,835.

Reissued June 26, 1900.

G. A. WEBER.

BOND FOR RAILS.

(Application filed Feb. 12, 1900.)

WITNESSES:

D. N. Hayward

Donald Campbell.

INVENTOR

George A. Weber

BY Edwin N. Drury

HIS ATTORNEY

UNITED STATES PATENT OFFICE.

GEORGE A. WEBER, OF STAMFORD, CONNECTICUT.

BOND FOR RAILS.

SPECIFICATION forming part of Reissued Letters Patent No. 11,835, dated June 26, 1900.

Original No. 508,736, dated August 9, 1893. Application for reissue filed February 12, 1900. Serial No. 4,918.

*To all whom it may concern:*

Be it known that I, GEORGE A. WEBER, a citizen of the United States of America, and a resident of Stamford, Fairfield county, State of Connecticut, have invented certain new and useful Improvements in Bonds for Rails, of which the following is a specification.

My invention relates to bonds for electrically connecting the meeting ends of adjacent rails.

I will describe a connection embodying my invention and then point out the novel features in the claims.

Figure 1:
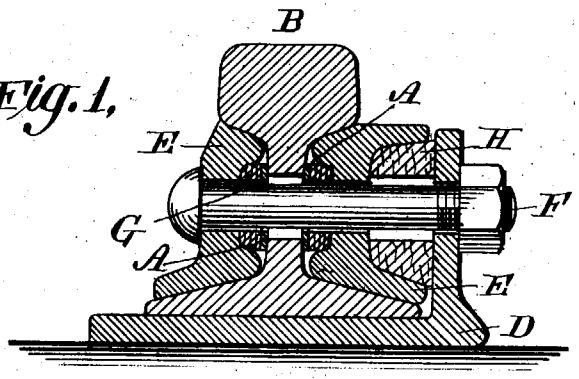
Figure 2:
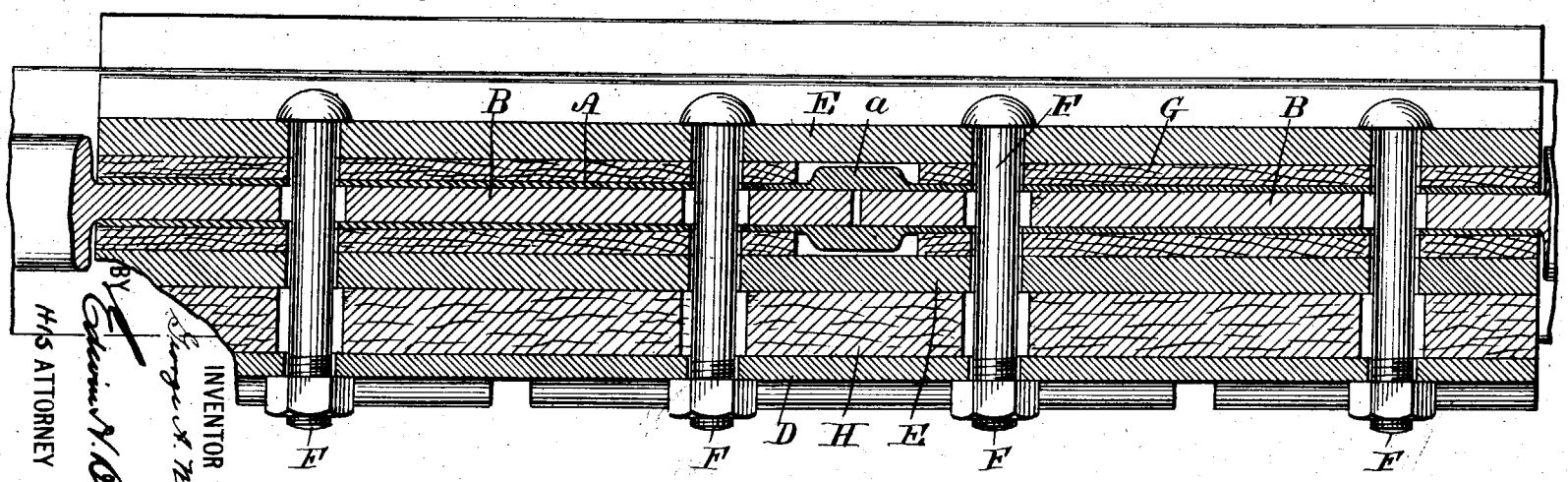

In the accompanying drawings, Figure 1 is a vertical transverse section of a rail-joint to which I have shown my bond applied, and Fig. 2 is a longitudinal and horizontal section of the rail-joint shown in Fig. 1.

Similar letters of reference designate corresponding parts in both figures of the drawings.

A represents a metal bond, preferably of copper, which may extend any distance desired along the rail, and it may be secured thereto by rivets or otherwise. The bond is preferably thin and flat throughout its length with the exception of the thickened, swelled, or protruding portion *a*, which when the bond is in position to form an electric connection between two rails is directly at the point of meeting of the ends of the rails, as clearly shown in Fig. 2.

The advantage of forming a bond with the thickened or enlarged portion intermediate the ends thereof and of having this part at a joint formed by the meeting ends of adjacent rails is that the end portions of the bond are taking off current from the rails at every point of contact and the amount of current taken off is equal to the amount of current in the rail, and it is therefore necessary when the joint is reached to provide a sufficient amount of metal in the bond at that point to transfer the whole amount of current contained in the bond end from one rail to the other with as little resistance as possible. In other words, the capacity of the metal of the bond at the joint for transferring current should be equal in capacity to the capacity of either of the ends of the bond for receiving current from the rail with which it is in contact.

The proportions of the parts of the bond vary according to the metal used in the bond and rails.

I have shown my bond in connection with the rail-joint, which comprises the rails B and C, the angle-chair D for supporting the ends of the rails, fish-plates E, and connecting-bolts F. In forming the joint the bond is placed along both sides of the web of each rail and an elastic packing G, which may be of wood, placed intermediate the fish-plates E and the bonds, so that the bonds will be firmly held in contact with the webs of the rails. The fish-plate adjacent the bolt-supporting flange of the angle-chair is channeled and the elastic packing H is inserted to take up lateral movement of the rails. The fastening-bolts are then inserted, as shown in Fig. 2, for firmly holding the several parts of the joint.

I claim as my invention—

1. A bond formed with end portions and a thickened or enlarged part intermediate its ends.

2. The combination with the meeting ends of adjacent rails, a bond therefor formed with the end portions extending along the web of each rail, and with a thickened or enlarged portion intermediate its ends and placed at the joint formed by the said rail ends, substantially as described.

3. The combination with the meeting ends of adjacent rails, fish-plates therefor, a bond on both sides of the web of each rail and extending along the same across the joint formed by the said rail ends, and an elastic packing intermediate each bond and adjacent fish-plate, substantially as specified.

4. The combination with the meeting ends of adjacent rails, an angle-chair for supporting the said ends, fish-plates for said rail ends, a bond extending on each side of the web of each rail and across the joint formed by said ends, an elastic packing intermediate each bond and adjacent fish-plate, an elastic packing intermediate the fish-plate and bolt-supporting flange of the angle-chair and fastening-bolts for uniting the several parts, substantially as described.

5. The combination with the meeting ends of adjacent rails, fish-plates therefor, a bond on one side of the web of each rail and extending along the same across the joint formed by the rail ends, and an elastic packing between the bond and the adjacent fish-plate.

6. The combination with the meeting ends of adjacent rails, an angle-chair for supporting the said ends, fish-plates for said rail ends, a bond extending along the web of each rail and across the joint formed by said ends, an elastic packing intermediate the said bond and adjacent fish-plate, and fastening means for the several parts.

7. The combination with the meeting ends of adjacent rails, an angle-chair for supporting said rail ends, fish-plates, a bond extending along the web of the rail ends and across the joint formed by the ends at which point it is thickened or enlarged, an elastic packing between the bond and adjacent fish-plate and means for connecting the several parts.

8. The combination with the meeting ends of adjacent rails, of a fish-plate joint therefor, a bond extending along one side of the web of each rail and across the space between the rail ends, and an elastic packing substantially filling the space between the bond and the adjacent fish-plate.

In testimony whereof I have signed my name to this specification in the presence of two subscribing witnesses.

GEORGE A. WEBER.

Witnesses:
DONALD CAMPBELL,
GEO. E. CRUSE.